US010199901B2

(12) United States Patent
Ehrsam

(10) Patent No.: US 10,199,901 B2
(45) Date of Patent: Feb. 5, 2019

(54) PUMP MOTOR WITH A HEAT DISSIPATION CONTAINMENT SHELL

(71) Applicant: Bühler Motor GmbH, Nürnberg (DE)

(72) Inventor: Jürgen Ehrsam, Fürth (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 106 days.

(21) Appl. No.: 15/483,167

(22) Filed: Apr. 10, 2017

(65) Prior Publication Data

US 2017/0302124 A1 Oct. 19, 2017

(30) Foreign Application Priority Data

Apr. 15, 2016 (DE) .................. 10 2016 206 406

(51) Int. Cl.
| | |
|---|---|
| H02K 9/00 | (2006.01) |
| H02K 5/18 | (2006.01) |
| H02K 5/128 | (2006.01) |
| H02K 11/33 | (2016.01) |
| F04D 13/06 | (2006.01) |
| F04D 29/22 | (2006.01) |
| F04D 29/58 | (2006.01) |
| H02K 1/27 | (2006.01) |
| H02K 9/08 | (2006.01) |

(Continued)

(52) U.S. Cl.
CPC ............... *H02K 5/18* (2013.01); *F04D 13/06* (2013.01); *F04D 29/22* (2013.01); *F04D 29/5806* (2013.01); *H02K 1/278* (2013.01); *H02K 5/128* (2013.01); *H02K 9/08* (2013.01); *H02K 11/0094* (2013.01); *H02K 11/33* (2016.01); *H02K 7/14* (2013.01); *H02K 9/197* (2013.01); *H02K 9/22* (2013.01); *H02K 2211/03* (2013.01); *H02K 2213/03* (2013.01)

(58) Field of Classification Search
CPC ...... H02K 5/18; H02K 11/33; H02K 2211/03; H02K 7/14; H02K 5/128; F04D 29/22; F04D 29/5806; F04D 13/06
USPC .............................................. 310/52–647, 71
See application file for complete search history.

(56) References Cited

U.S. PATENT DOCUMENTS

2007/0252487 A1* 11/2007 Fujii ...................... H02K 1/146
310/68 B
2007/0286723 A1* 12/2007 Ihle ...................... F04D 29/5893
415/206

(Continued)

FOREIGN PATENT DOCUMENTS

| DE | 10 2008 064 099 A1 | 7/2010 |
|---|---|---|
| EP | 2 905 471 A1 | 8/2015 |

*Primary Examiner* — Thanh Lam
(74) *Attorney, Agent, or Firm* — Westerman, Hattori, Daniels & Adrian, LLP

(57) ABSTRACT

Pump motor, with a crankcase, a pump head, and a containment shell, whereby the pump head with the containment shell defines a wet chamber and the containment shell with the crankcase defines a dry chamber, a permanent magnet rotor is rotatably mounted in the wet chamber around an axis, a wound stator and a printed circuit board are arranged in the dry chamber and the printed circuit board is located opposite to the containment shell bottom. The pump motor economically provides for a reliable heat dissipation with an increased heat dissipation capacity, from the printed circuit board into the medium which has to be transported, in the case of a pump motor of an appropriate kind.

12 Claims, 6 Drawing Sheets

(51) Int. Cl.
*H02K 11/00* (2016.01)
*H02K 7/14* (2006.01)
*H02K 9/197* (2006.01)
*H02K 9/22* (2006.01)

(56) References Cited

U.S. PATENT DOCUMENTS

| | | | |
|---|---|---|---|
| 2008/0031748 A1* | 2/2008 | Ihle | F04D 29/026 417/321 |
| 2009/0079293 A1* | 3/2009 | Hashimoto | H02K 1/145 310/257 |
| 2012/0091839 A1* | 4/2012 | Hein | H02K 5/225 310/71 |
| 2017/0302133 A1* | 10/2017 | Ehrsam | F04D 29/426 |

* cited by examiner

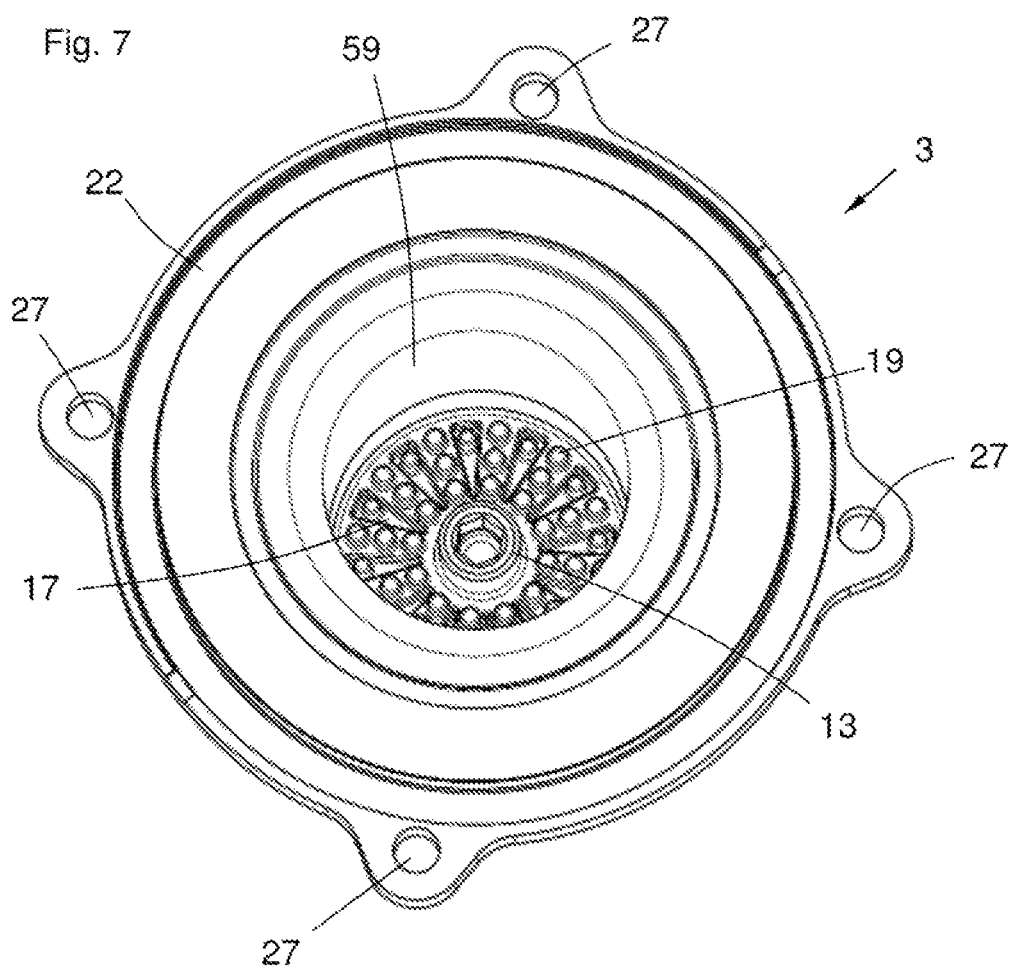

PUMP MOTOR WITH A HEAT DISSIPATION CONTAINMENT SHELL

BACKGROUND OF THE INVENTION (1) Field of the Invention

The invention concerns pump motors, in general, and pump motors with heat dissipation, in particular.

(2) Description of Related Art Including Information Disclosed Under 37 CFR 1.97 and 1.98

With combustion engines in the field of power-driven vehicles, generally, there are mechanical pumps available, powered from the crankshaft over a toothed belt as a main cooling water pump. As a support or an alternative in a shut-off combustion engine, electric ancillary cooling water pumps are used, which are generally designed as electronically commutated direct-current motors. Main cooling water pumps can also be run electrically. Cooling water pumps are likewise used at hybrid and electric vehicles. There primarily in the cooling circuit of an accumulator cooling system. Electronically commutated direct current motors, generally, feature printed circuit boards with electronic assembly parts, especially performance components for the commutation of the stator winding. In these components, depending on the engine-power class, more or less heat develops, which should be dissipated as easily as possible, in order to avoid damages through overheating. It is common to lead the heat capacity over the separation can into the transporting medium, provided that the medium can serve as a heat sink. Due to the continuous recirculation of the medium, the heat is transported from the pump chamber through an enforced convection and, for instance, to a vehicle cooling system. Since for the heat transmission only a relatively small surface is available, just a limited heat dissipation capacity can be reached, whereby the capabilities of the pump are restricted.

BRIEF SUMMARY OF THE INVENTION

The invention concerns a pump motor, with a crankcase, a pump head and a containment shell, whereby the pump head with the containment shell defines a wet chamber and the containment shell with the crankcase defines a dry chamber, a permanent magnet rotor in the wet chamber is mounted in a rotatable way around an axis, a wound stator and a printed circuit board are positioned, in the dry chamber and the printed circuit board faces a bottom of the containment shell.

The task of the present invention with a pump motor of the appropriate kind is therefore to look in an economic way for a reliable heat dissipation with an increased heat dissipation capacity from the printed circuit board into the medium which has to be transported.

Due to the recesses and the opposite protrusions, the surface available for the heat transmission is considerably increased. In this way the pump motor can be run with a significantly higher capacity, without risking damage to the electronic assembly parts.

It has proved to be especially effective, when the recesses in the bottom of the containment shell are filled with a heat conduction medium, for instance, a thermally conductive paste. The heat conduction medium can moisten all the surface areas of the recesses and provide a significantly better heat transfer.

The recesses can be formed in a way that the cross section of the recesses is diminished in the axially parallel direction and the direction of the permanent magnet rotor.

The surface of the containment shell bottom can be considerably increased, due to the recesses. It is intended to dimension the recesses in such a way, that the surface is increased more that twice, compared to a flat or planar containment shell bottom.

On the wet side peg-formed protrusions are preferably provided. A multitude of these protrusions can strongly enlarge the surface. Also here, in a first step, a surface enlargement is being proposed, which corresponds to more than twice the surface of a flat or planar containment shell bottom.

In case of a further developed pump, the surface is being enlarged at least to three times that of a flat separation can bottom, whereby even higher heat dissipation capacities can be achieved.

According to a further development of the invention, on the printed circuit board enlarged circuit path areas are provided, which are connected to the heat conduction medium, in terms of heat transfer, for instance, to a thermally conductive paste. These circuit path areas consist of copper and they can distribute the heat in the printed circuit board well so that also at more distant areas of the conductor board higher temperature gradients exist towards the containment shell bottom.

Especially advantageous is the use of Thermovias, which transmits the heat arising on the first printed circuit board to the opposite side of the printed circuit board. At this normally unpopulated side there is enough space to accommodate the enlarged circuit path areas. Thereby a multitude of Thermovias is designated for each heat producing component, in order to optimize the heat transmission ability.

BRIEF DESCRIPTION OF THE SEVERAL VIEWS OF THE DRAWINGS

The invention is better understood by reading the following Detailed Description of the Preferred Embodiments with reference to the accompanying drawing figures, in which like reference numerals refer to like elements throughout, and in which:

FIG. 7 shows a further diagram of the containment shell.

DETAILED DESCRIPTION OF THE INVENTION

Figure 1:
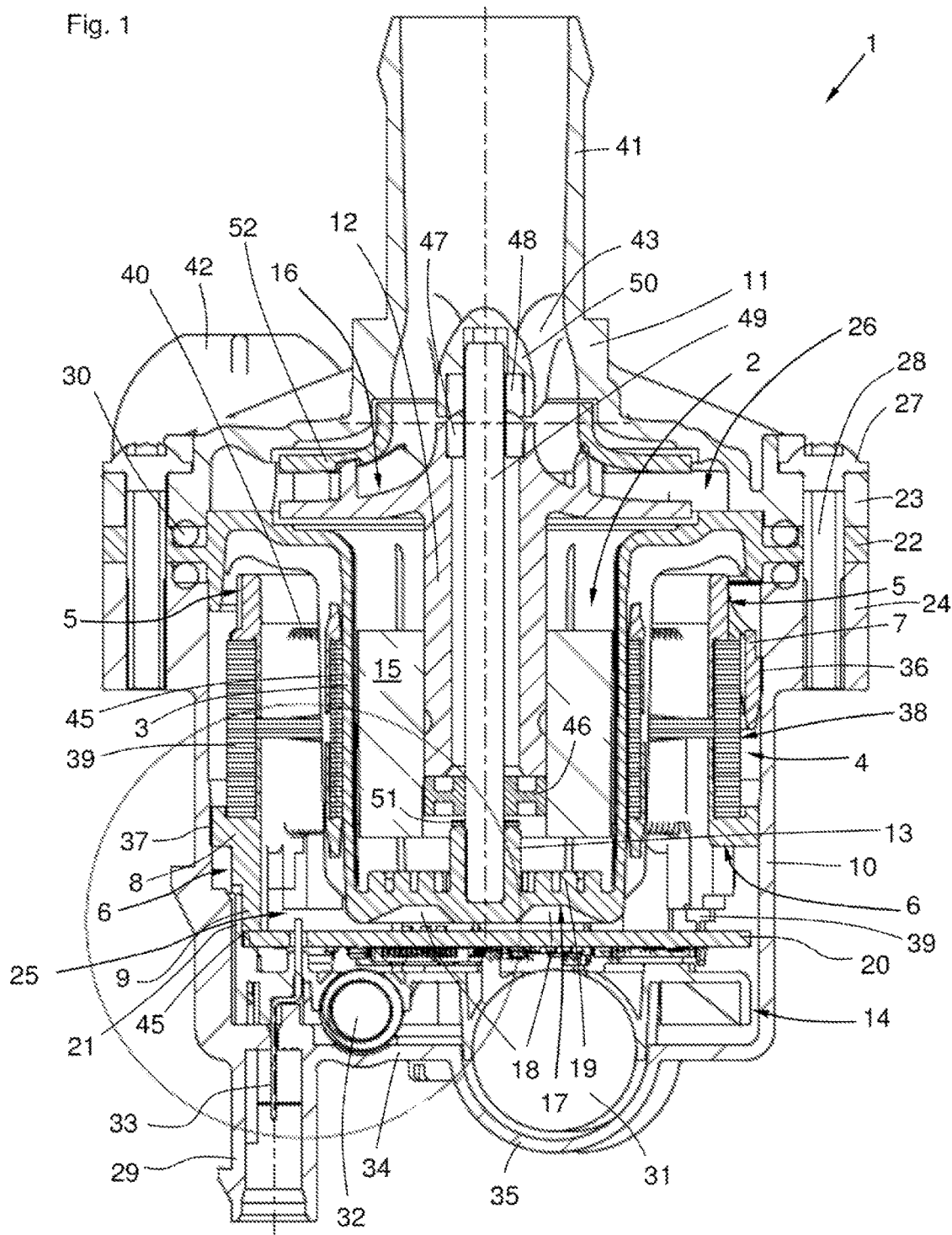
FIG. 1 shows a cross-sectional view of a pump motor incorporating the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a sectional view of a pump motor 1, with a wound stator 4, a permanent magnet rotor 2, a containment shell 3, a pump head 11, a printed circuit board 20, a mounting plate 14 and a crankcase 10. The stator 4, the printed circuit board 20 and the mounting plate 14 are located in a dry chamber 25. The permanent magnet rotor 2 is in a wet chamber 26 and is mounted rotatably around an axis 49, which is, on one side, defined in the containment shell 3 and, on the other side, in the pump head 11. The stator 4 comprises a stator's laminated sheet package 38, insulating elements 5, 6 and a stator winding 40. Radially, fixation protrusions 7, 8 are extended from the insulating elements 5, 6. The fixation protrusions 7, 8 feature welding areas 36, 37, on which they are firmly connected to the crankcase 10. The second insulating element 6 is populated with axially inserted winding connections 39, which are, as press-in contacts, mechanically and electrically connected to the printed circuit board 20. The stator 4 is largely decoupled from the containment shell 3.

A printed circuit board-sided insulation element 6 comprises axial noses 9, through which they fit axially to the printed circuit board 20. The printed circuit board 20 is fixed in a positive locking way between the axial protrusions 9 and the mounting plate 14. The mounting plate 14 features a locating surface 45, which serves the axial fixation of the printed circuit board 20. On the opposite side of the mounting plate 14 it fits to a bottom 34 of the motor housing 10. Furthermore, the mounting plate 14 comprises radial limiting means 21, through which the radial installation space of the conductor board 20 is limited. Furthermore, the motor housing 10 comprises at its bottom 34 a plug tray 29. The containment shell 3 features a containment shell flange 22 and the pump head 11 features a pump head flange 23. The motor housing 10 is formed as a can and it features a case flange 24 and a plug tray 29. The pump head flange 23, the containment shell flange 22 and the case flange 24 feature eye bolts 27 with screws 28, through which the pump head 11 and the containment shell 3 are bolted together with the motor housing 10. On both sides of the containment shell flange 23 O-rings 30 are arranged as sealing elements. The printed circuit board 20 is populated with a large number of SMD-components. Bigger assembly parts, such as an electrolytic capacitor 31 and a choking coil 32 are held mechanically on the mounting plate 14, but contacted electrically to the printed circuit board 20. The printed circuit board 20 and the mounting plate 14 are axially fixed between the stator 4 and the motor housing 10. The printed circuit board 20 is axially and radially fixed between the stator 4 and the mounting plate 14. In the mounting plate 14 a contact element 33 is mechanically incorporated, which is likewise electrically connected to the printed circuit board 20.

A bottom 34 of the can-formed motor housing 10 features a bulge 35, which is adapted to the form of the electrolytic capacitor 31. Furthermore, a pump impeller 16 is represented, which defines one part with a hollow shaft 12. The pump impeller 16 at its top features a cover plate 52. The permanent magnet rotor 2 with the pump impeller 16 is bedded in a rotationally movable way over a fixed bearing 46 and a spherical slide bearing 47 on the axis 49 and between the pump head 11 and the containment shell 3. The spherical bearing 47 fits into a spherical counter bearing 48. The fixed bearing 46 is positioned between a permanent magnet 15 which is shaped as a hollow cylinder, molded around the hollow shaft 12, composed of a plastic-bonded material, and the axis 49. The fixed bearing 46 embeds the pump impeller 16 radially, as well as axially, over the end of the hollow shaft 12 and a guard plate 51, which fits to a single part axis carrying sleeve 13 formed with the containment shell 3. The pump head 11 comprises an inlet side 41 and an outlet side 42. In the inlet side 41 spokes 43 produce a permeable connection between the inlet side 41 and a retainer 50. Furthermore, a containment shell bottom 17 is represented with protrusions 19 and recesses 18.

Figure 2:
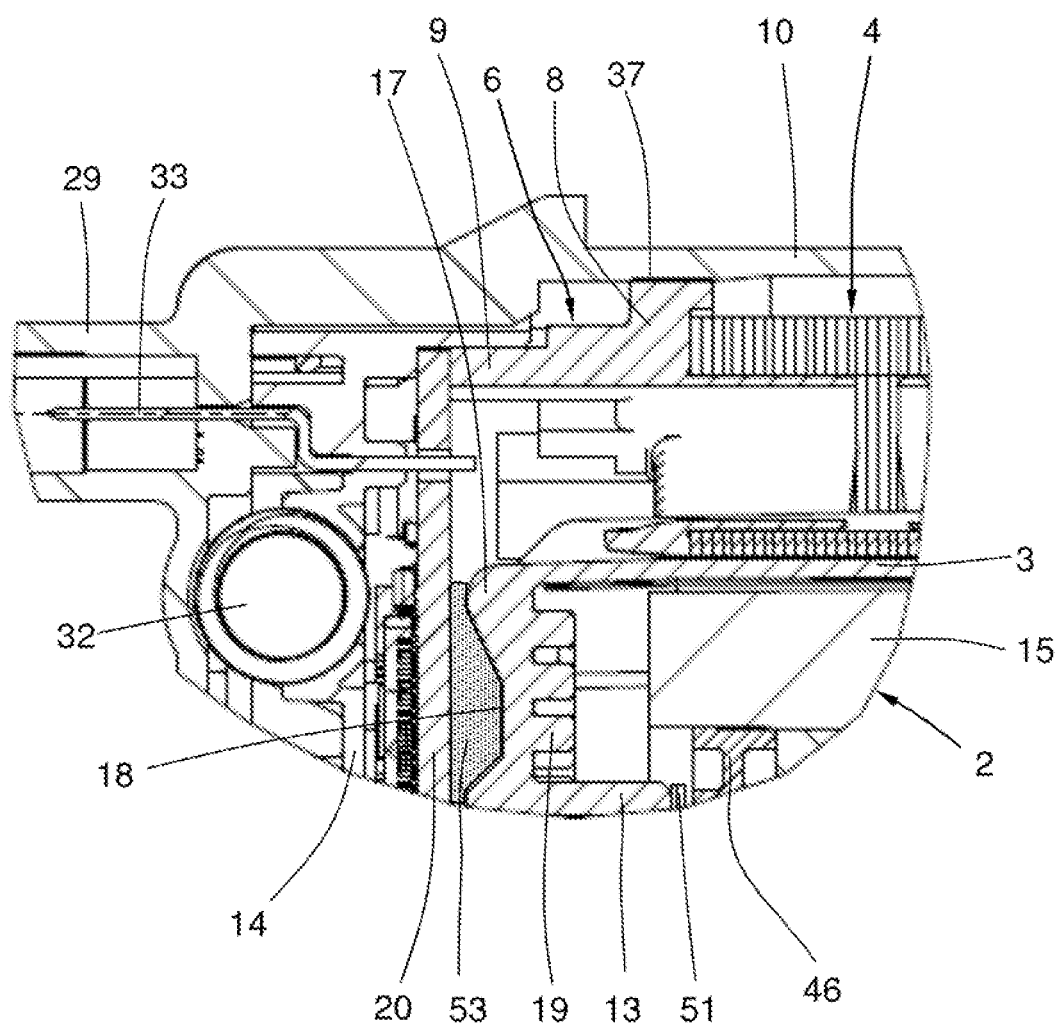
FIG. 2 shows a circular cross-section from FIG. 1.

FIG. 2 shows a cutout from FIG. 1, with the motor housing 10, the stator 4, the second insulating element 6, the second fixation protrusion 8, the second welding area 37, the axial protrusion 9, the printed circuit board 20, the mounting plate 14, the permanent magnet rotor 2, with the permanent magnet 15, the containment shell 3, the containment shell bottom 17, the recess 18, the protrusions 19, the axis carrying sleeve 13, the fixed bearing 46, the guard plate 51, the plug tray 29, the contact element 33, the choking coil 32 and a heat transmission medium 53. The heat transmission medium 53 fills up the recesses 18 and—if available—an interstitial space between the containment shell bottom 17 and the conductor board 20.

Figure 3:
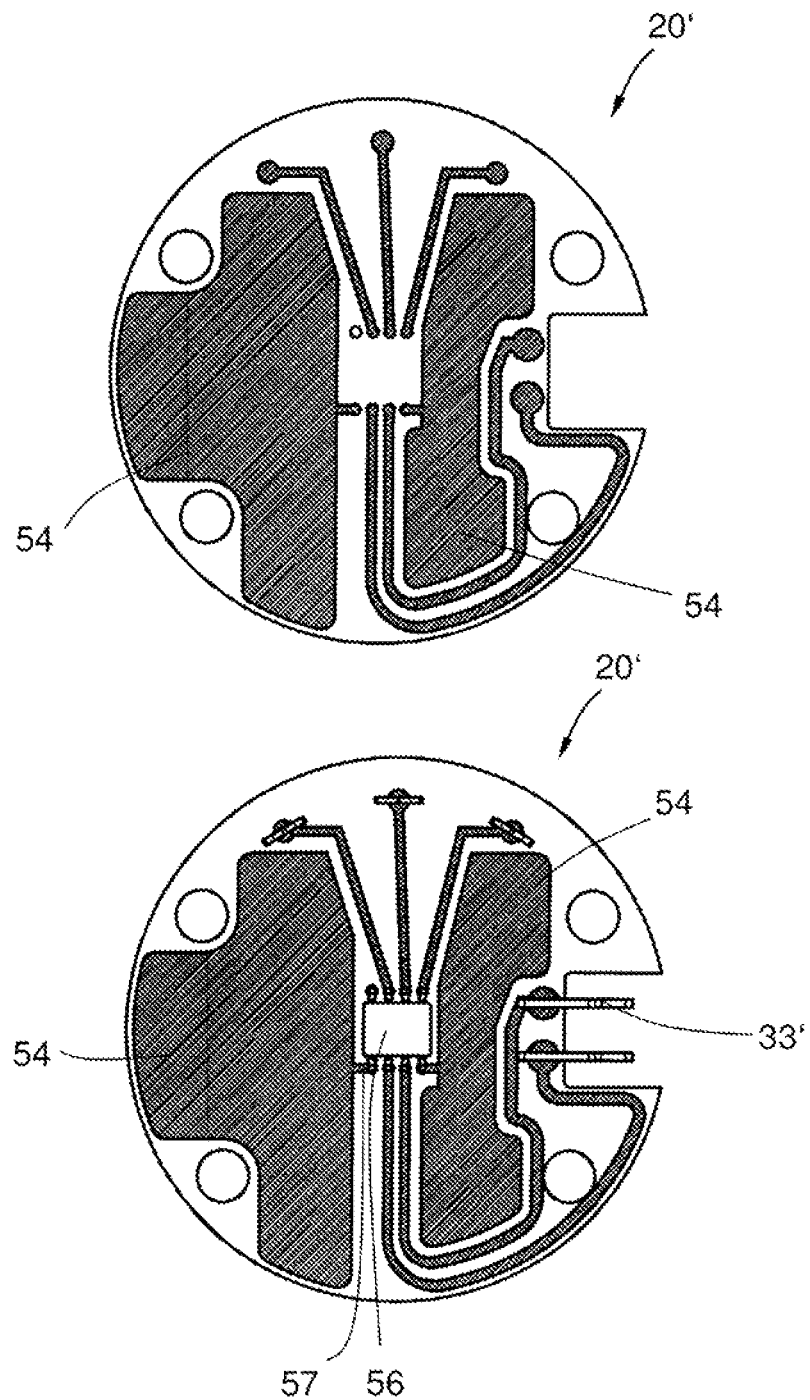
FIG. 3 shows a conductor board with enlarged circuit path areas.

FIG. 3 shows a printed circuit board 20' with enlarged circuit path areas 54, whereby the heat transmission on a heat transmission medium 53 is improved. A component 56 produces heat which is conducted over circuit paths 57 on the enlarged circuit path areas 54. The component 56 is here positioned on the same side as the circuit path areas 54. The distance to the can bottom has to be overcome through the heat transmission medium. For the component 56 a further recess 18 in the containment shell bottom 17 can be alternatively provided.

Figure 4:
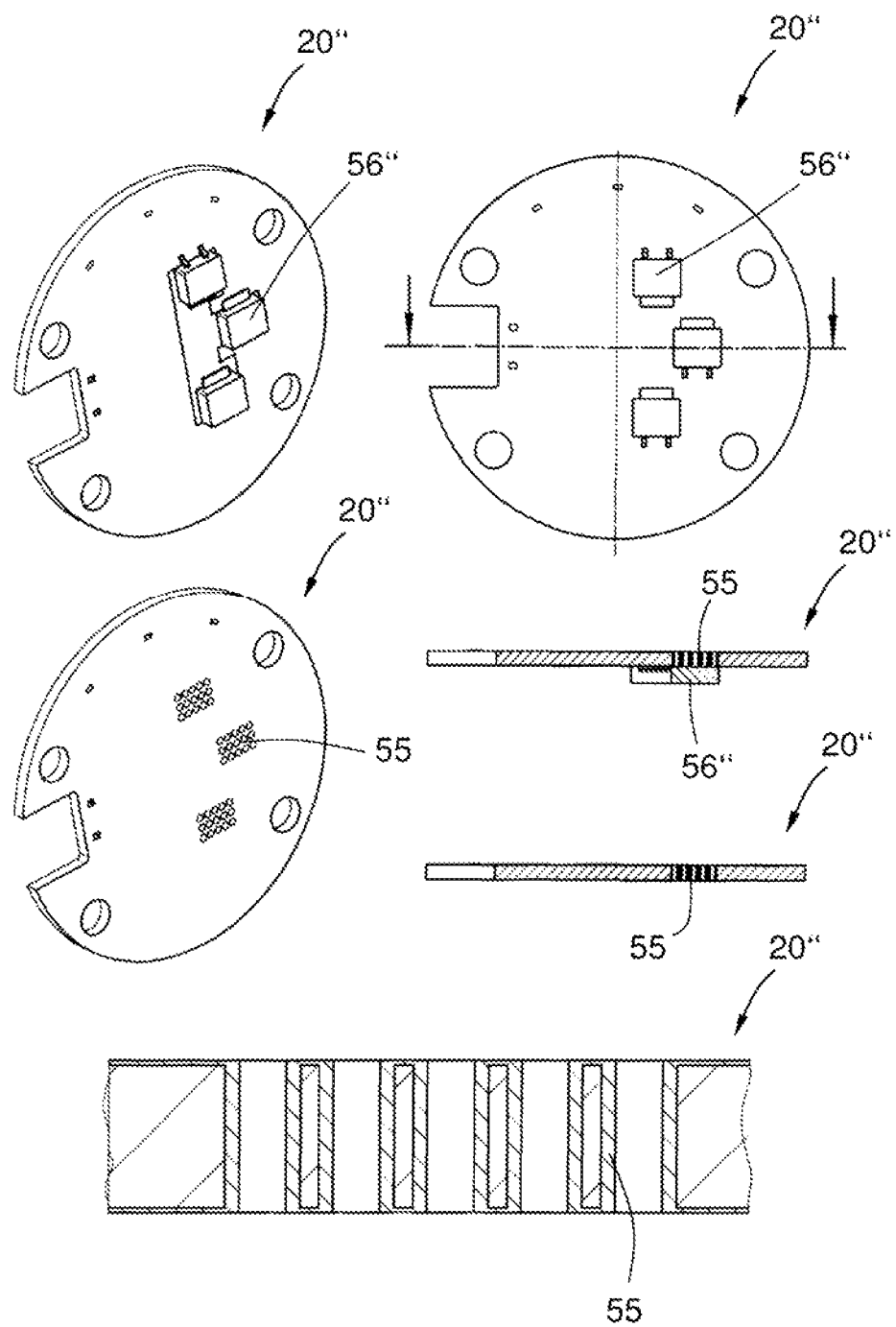
FIG. 4 shows a printed circuit board with Thermovias.

FIG. 4 shows a printed circuit board 20" with Thermovias 55 and heat producing components 56". The Thermovias 55 conduct the heat produced by the components 56" to the opposite side of the printed circuit board. For each component 56" a large number of Thermovias 55 is provided, in order to enlarge the conductor cross section. On the opposite side, enlarged circuit path areas 54 can provide an improved heat transfer into a heat transmission medium 53 or directly on the containment shell bottom 17.

Figure 5:
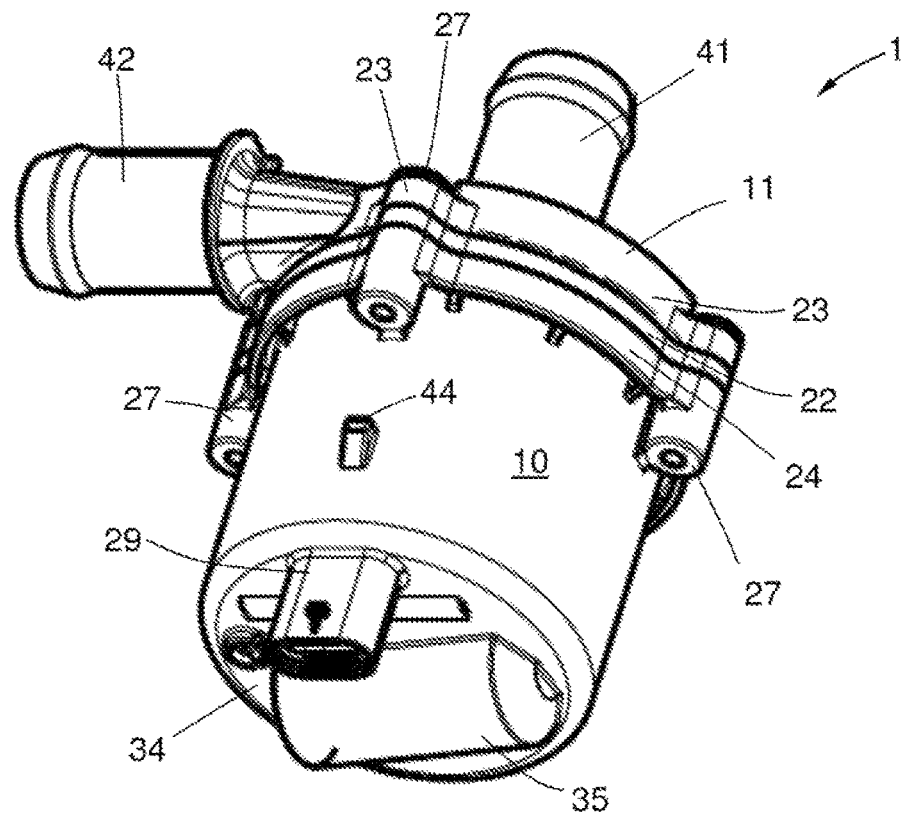
FIG. 5 shows a spatial diagram of the pump motor.

FIG. 5 shows a spatial representation of the pump motor 1, with the pump head 11, with the inlet side 41 and the outlet side 42 and the pump head flange 23, the containment shell flange 22, building one part with the containment shell 3, the motor housing 10 with the housing flange 24, the bottom 34, the plug tray 29 and the bulge 35 for the retainer of an electrolytic capacitor 31. Further, screw eyes 27 can be recognized which are constructed as extensions in the pump head flange 23, the containment shell flange 22 and the case flange 24 and they enable a bolted connection. At the motor housing 10 an axial cutout 44 is constructed, which has the function to protect axially a ring-like fixation installation, laid around the motor housing 10.

Figure 6:
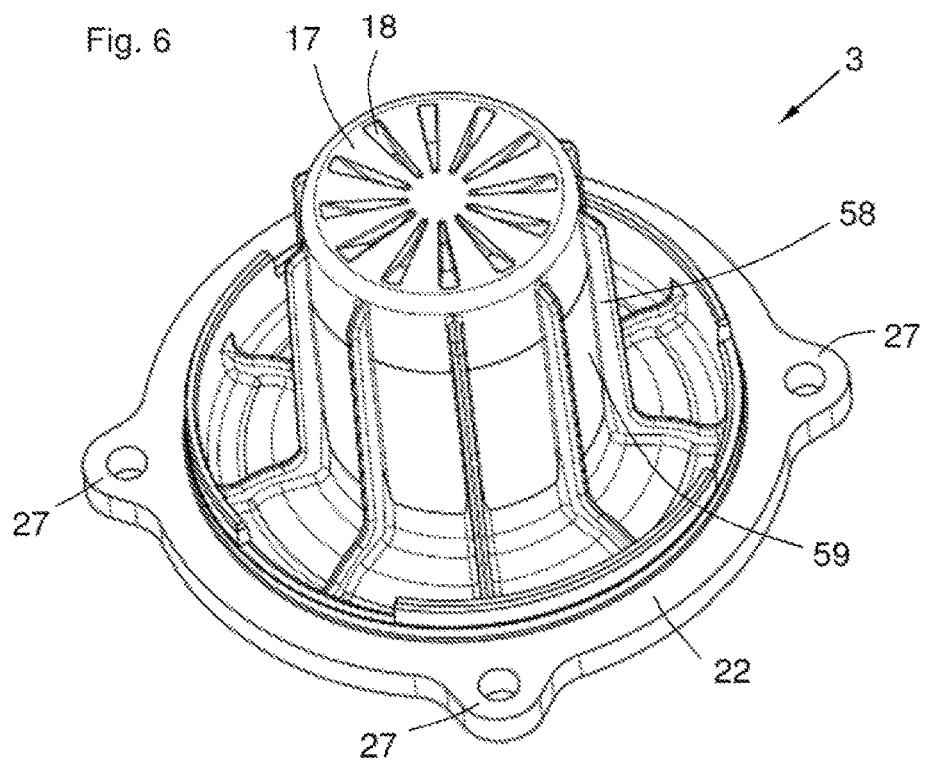
FIG. 6 shows a spatial diagram of a containment shell.

FIG. 6 shows a spatial representation of the containment shell 3 with cooling fins 58, which mesh on stator slots in the installed condition. The cooling fins 58 constitute basically one part with the cylindrical skin surface 59 of the containment shell 3 and they extend radially out of it. The cooling fins 58 partially continue at the separation can flange 22. The screw eyes 27 connect to it. In the containment shell bottom 17 the recesses 18 are molded. The recesses 18 run from radially outside to inside of the containment shell bottom 17 continuously to a maximum depth, they remain partially at this depth and run afterwards continuously, but slightly steeper back to the containment shell bottom 17. This forming is due to the injection molding technique. The recesses 18 feature a kind of segment of a circle base area.

FIG. 7 shows a further representation of the containment shell 3, viewed from the opposite side. From the containment shell bottom 17 in the central area, the axis carrying sleeve 13 protrudes. From the containment shell bottom 17 an additional large number of protrusions 19 protrude axially. The protrusions 19 are here constructed as cylindrical pegs. The containment shell flange 22 is, in addition, represented with the screw eyes 27 and the skin surface 59.

It is to be understood that the present invention is not limited to the illustrated embodiments described herein. Various types and styles of user interfaces may be used in accordance with the present invention without limitation. Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE SYMBOLS:

1 pump motor
2 permanent magnet rotor
3 containment shell
4 stator
5 first insulating element
6 second insulating element
7 first fixation protrusion
8 second fixation protrusion
9 axial protrusion
10 motor housing
11 pump head
12 hollow shaft
13 axis carrying sleeve
14 mounting plate
15 permanent magnet
16 pump impeller
17 containment shell bottom
18 recesses
19 protrusion
20 printed circuit board
21 radial limiting means
22 containment shell flange
23 pump head flange
24 case flange
25 drying chamber
26 wet chamber
27 screw eye
28 screw
29 plug tray
31 electrolytic capacitor
32 choking coil
33 contact element
34 bottom
35 bulge
36 first welding area
37 second welding area
38 stator's laminated sheet package
39 winding connection
40 stator winding
41 inlet side
42 outlet side
43 spoke
44 axial cutout
45 locating surface
46 fixed bearing
47 spherical slide bearing
48 spherical counter bearing
49 axis
50 retainer
51 guard plate
52 cover plate
53 heat transmission medium
54 circuit path area
55 Thermovia
56 assembly part
57 circuit path
58 cooling fin
59 skin surface

What is claimed is:

1. A pump motor comprising:
a motor housing;
an axis;
a pump head;
a containment shell with a bottom;
a wet chamber defined by the pump head and the containment shell;
a dry chamber defined by the containment shell and the motor housing;
a permanent magnet rotor rotatably mounted in the wet chamber around the axis;
a wound stator in the dry chamber; and
a printed circuit board arranged in the dry chamber and positioned opposite the containment shell bottom, which includes recesses on the side opposite to the printed circuit board and protrusions on an alternate side facing the printed circuit board.

2. The pump motor according to claim 1, wherein, the recesses are filled with a heat transmission medium that provides a heat conductance path from the containment shell bottom to the printed circuit board.

3. The pump motor according to claim 2, wherein the heat transmission medium comprises a thermally conductive paste.

4. The pump motor according to claim 1, wherein the cross section of the recesses is diminished in the axially parallel direction and in the direction of the permanent magnet rotor.

5. The pump motor according to claim 1, wherein the surface of the containment shell bottom, due to the recesses, compared to a planar containment shell bottom, is enlarged more than twice.

6. The pump motor according to claim 1, wherein the protrusions are formed as pegs.

7. The pump motor according to claim 1, wherein the surface of the containment shell bottom, due to the protrusions, compared to a planar containment shell bottom, is enlarged more than twice.

8. The pump motor according to claim 1, wherein the surface of the containment shell bottom, due to the protrusions, compared to a planar containment shell bottom, is more than triple.

9. The pump motor according to claim 1, wherein the surface of the containment shell is enlarged through cooling fins, which protrude radially in stator slots, coming from the surface of the containment shell.

10. The pump motor according to claim 1, wherein, on the printed circuit board enlarged circuit path areas are provided, which are connected to the heat transmission medium to aid in heat transfer.

11. The pump motor according to claim 10, wherein the heat transmission medium comprises a thermally conductive paste.

12. The pump motor according to the claim 10, further comprising: Thermovias in the printed circuit board, the Thermovias being arranged in the area of components which represent heat sources, and which transport the heat to the opposite side of the printed circuit board, to the enlarged circuit path areas.

* * * * *